United States Patent
Moore, Jr. et al.

(10) Patent No.: US 7,894,596 B2
(45) Date of Patent: Feb. 22, 2011

(54) SYSTEMS AND METHODS FOR PROVIDING LANGUAGE INTERPRETATION

(75) Inventors: James L. Moore, Jr., Carmel, CA (US); Louis Provenzano, Monterey, CA (US)

(73) Assignee: Language Line Services, Inc., Monterey, CA (US)

( * ) Notice: Subject to any disclaimer, the term of this patent is extended or adjusted under 35 U.S.C. 154(b) by 267 days.

(21) Appl. No.: 11/532,018

(22) Filed: Sep. 14, 2006

(65) Prior Publication Data

US 2007/0121903 A1    May 31, 2007

Related U.S. Application Data

(63) Continuation-in-part of application No. 11/277,318, filed on Mar. 23, 2006, which is a continuation-in-part of application No. 11/226,526, filed on Sep. 13, 2005.

(51) Int. Cl.
*H04M 3/42* (2006.01)

(52) U.S. Cl. .................. 379/265.12; 326/37; 348/14.09; 370/352; 379/88.05; 379/114.2; 379/265.01; 705/77

(58) Field of Classification Search .................. 379/223, 379/203.01, 88.17, 45, 265.12, 88.05, 114.2, 379/265.01; 455/416, 407; 326/37; 348/14.09; 370/352; 705/77
See application file for complete search history.

(56) References Cited

U.S. PATENT DOCUMENTS 4,445,211 A    4/1984   Webber (Continued)

FOREIGN PATENT DOCUMENTS

EP    0 601 710    6/1994

(Continued)

OTHER PUBLICATIONS

Carey Gillam, "Language Line Gives Guests A Chance To Reach Out Touch A Translator", The Kansas City Business Journal, Aug. 30, 1991, p. 2, vol. 9 No. 50.

(Continued)

*Primary Examiner*—Gerald Gauthier
(74) *Attorney, Agent, or Firm*—Patent Ingenuity, P.C.; Samuel K. Simpson

(57) ABSTRACT

A method and system of providing a language interpretation service is disclosed. A language interpretation number, such as an 811 number, can be provided. The language interpretation number can be used to place a telephone call to a language interpretation service for language assistance. A language interpretation telephone call is received at the language interpretation service provider from a caller speaking a first language. The caller places the language interpretation telephone call by dialing the language interpretation number. The caller has at least one business need. The first language is identified so as to provide the customer with an interpreter that can interpret between a first language and a second language. The interpreter can be associated with the language interpretation service provider. The interpreter can telephonically engage an agent representing a business entity that can service the at least one business need of the caller. The business entity is a subscriber of the language interpretation provider. The first agent speaks the second language and the interpreter interprets a conversation between the caller and the agent.

35 Claims, 11 Drawing Sheets

U.S. PATENT DOCUMENTS

| | | | |
|---|---|---|---|
| 4,691,347 A | 9/1987 | Stanley et al. | |
| 4,882,681 A | 11/1989 | Brotz | |
| 5,136,633 A | 8/1992 | Tejada et al. | |
| 5,353,335 A | 10/1994 | D'Urso et al. | |
| 5,373,549 A | 12/1994 | Bales et al. | |
| 5,375,164 A | 12/1994 | Jennings | |
| 5,392,343 A * | 2/1995 | Davitt et al. | 379/265.12 |
| 5,426,706 A | 6/1995 | Wood | |
| 5,509,060 A | 4/1996 | Hall et al. | |
| 5,544,229 A | 8/1996 | Creswell et al. | |
| 5,590,186 A | 12/1996 | Liao et al. | |
| 5,684,867 A | 11/1997 | Gesslein, Jr. et al. | |
| 5,749,075 A | 5/1998 | Toader et al. | |
| 5,794,218 A | 8/1998 | Jennings et al. | |
| 5,797,092 A | 8/1998 | Cox et al. | |
| 5,825,863 A | 10/1998 | Walker | |
| 5,875,422 A | 2/1999 | Eslambolchi et al. | |
| 5,884,246 A | 3/1999 | Boucher et al. | |
| 5,937,051 A | 8/1999 | Hurd et al. | |
| 5,953,400 A * | 9/1999 | Rosenthal et al. | 379/202.01 |
| 5,960,070 A | 9/1999 | O'Donovan | |
| 5,970,124 A | 10/1999 | Csaszar et al. | |
| 5,991,748 A | 11/1999 | Taskett | |
| 6,038,292 A | 3/2000 | Thomas | |
| 6,069,939 A | 5/2000 | Fung et al. | |
| 6,097,806 A | 8/2000 | Baker et al. | |
| 6,115,458 A | 9/2000 | Taskett | |
| 6,134,306 A | 10/2000 | Lautenschlager et al. | |
| 6,161,082 A | 12/2000 | Goldberg et al. | |
| 6,205,215 B1 | 3/2001 | Dombakly | |
| 6,208,851 B1 | 3/2001 | Hanson | |
| 6,227,972 B1 | 5/2001 | Walker et al. | |
| 6,229,879 B1 | 5/2001 | Walker et al. | |
| 6,246,755 B1 | 6/2001 | Walker et al. | |
| 6,263,058 B1 | 7/2001 | Lautenschlager et al. | |
| 6,289,088 B1 | 9/2001 | Bruno et al. | |
| 6,292,769 B1 | 9/2001 | Flanagan et al. | |
| 6,301,566 B1 | 10/2001 | Costello | |
| 6,337,903 B1 | 1/2002 | Manner | |
| 6,363,411 B1 | 3/2002 | Dugan et al. | |
| 6,381,316 B2 | 4/2002 | Joyce et al. | |
| 6,597,765 B1 | 7/2003 | Ksiazek | |
| 6,665,387 B2 | 12/2003 | Hannu | |
| 6,690,932 B1 | 2/2004 | Barnier et al. | |
| 6,760,411 B2 | 7/2004 | Dybedokken et al. | |
| 6,801,602 B2 | 10/2004 | Glossbrenner | |
| 6,826,269 B2 | 11/2004 | Afana | |
| 6,856,674 B1 | 2/2005 | De Trana et al. | |
| 6,907,256 B2 | 6/2005 | Hokao | |
| 6,920,487 B2 | 7/2005 | Sofer et al. | |
| 6,963,557 B2 | 11/2005 | Knox | |
| 6,999,758 B2 | 2/2006 | Pence et al. | |
| 7,006,604 B2 | 2/2006 | Engelke | |
| 7,068,668 B2 | 6/2006 | Feuer | |
| 7,184,539 B2 * | 2/2007 | Colson et al. | 379/265.01 |
| 7,307,651 B2 * | 12/2007 | Chew | 348/14.09 |
| 7,376,415 B2 | 5/2008 | Surette | |
| 7,539,296 B2 * | 5/2009 | Basson et al. | 379/265.12 |
| 2001/0032878 A1 | 10/2001 | Tsiounis et al. | |
| 2001/0034599 A1 | 10/2001 | Kage et al. | |
| 2001/0051514 A1 * | 12/2001 | Lindholm | 455/404 |
| 2002/0046035 A1 | 4/2002 | Kitahara et al. | |
| 2002/0069048 A1 | 6/2002 | Sadhwani et al. | |
| 2002/0069067 A1 | 6/2002 | Klinefelter et al. | |
| 2002/0097854 A1 | 7/2002 | Bauer | |
| 2002/0136381 A1 * | 9/2002 | Shaffer et al. | 379/201.02 |
| 2002/0152063 A1 | 10/2002 | Tokieda et al. | |
| 2002/0169592 A1 | 11/2002 | Aityan | |
| 2002/0181669 A1 | 12/2002 | Takatori et al. | |
| 2003/0008639 A1 | 1/2003 | Kanegae | |
| 2003/0013438 A1 * | 1/2003 | Darby | 455/419 |
| 2003/0095542 A1 | 5/2003 | Chang et al. | |
| 2003/0144912 A1 | 7/2003 | McGee | |
| 2003/0149557 A1 | 8/2003 | Cox et al. | |
| 2003/0154122 A1 | 8/2003 | Jackson, Jr. et al. | |
| 2003/0158722 A1 | 8/2003 | Lord | |
| 2003/0163300 A1 | 8/2003 | Kasvand et al. | |
| 2003/0208352 A1 | 11/2003 | Lee | |
| 2004/0014462 A1 | 1/2004 | Surette | |
| 2004/0017897 A1 | 1/2004 | Engelke | |
| 2004/0092293 A1 | 5/2004 | Lee et al. | |
| 2004/0096050 A1 * | 5/2004 | Das et al. | 379/265.12 |
| 2004/0128139 A1 | 7/2004 | Ilan et al. | |
| 2004/0165579 A1 | 8/2004 | Mandle | |
| 2004/0218737 A1 | 11/2004 | Kelly | |
| 2004/0267538 A1 | 12/2004 | Obuchi et al. | |
| 2005/0084078 A1 * | 4/2005 | Miller et al. | 379/88.06 |
| 2005/0122959 A1 | 6/2005 | Ostrover et al. | |
| 2005/0129215 A1 | 6/2005 | Parker | |
| 2005/0149335 A1 | 7/2005 | Mesbah et al. | |
| 2005/0152530 A1 | 7/2005 | Pence et al. | |
| 2005/0209859 A1 | 9/2005 | Tenembaum et al. | |
| 2005/0216252 A1 | 9/2005 | Schoenbach et al. | |
| 2005/0251421 A1 | 11/2005 | Chang et al. | |
| 2005/0261890 A1 | 11/2005 | Robinson | |
| 2005/0272414 A1 * | 12/2005 | Vallarino | 455/417 |
| 2006/0023869 A1 * | 2/2006 | Reynolds et al. | 379/265.12 |
| 2006/0026001 A1 | 2/2006 | Bravin et al. | |
| 2006/0126821 A1 | 6/2006 | Sahashi | |
| 2006/0165225 A1 | 7/2006 | Sahashi | |
| 2007/0041370 A1 * | 2/2007 | Cleveland | 370/352 |
| 2007/0050306 A1 * | 3/2007 | McQueen | 705/77 |
| 2007/0064913 A1 | 3/2007 | Shaffer et al. | |
| 2007/0064915 A1 * | 3/2007 | Moore et al. | 379/265.12 |
| 2007/0064916 A1 * | 3/2007 | Moore et al. | 379/265.12 |
| 2007/0071181 A1 * | 3/2007 | Hwang | 379/45 |
| 2007/0121903 A1 * | 5/2007 | Moore et al. | 379/265.12 |
| 2008/0049929 A1 * | 2/2008 | Miloslavsky et al. | 379/265.12 |
| 2008/0095355 A1 * | 4/2008 | Mahalaha et al. | 379/265.09 |
| 2008/0205629 A1 * | 8/2008 | Basson et al. | 379/265.12 |
| 2008/0240388 A1 * | 10/2008 | Surette | 379/114.2 |
| 2009/0190748 A1 * | 7/2009 | Chishti et al. | 379/265.13 |
| 2010/0026339 A1 * | 2/2010 | Koo | 326/37 |

FOREIGN PATENT DOCUMENTS

| | | |
|---|---|---|
| EP | 1 041 801 A2 | 10/2000 |
| EP | 1 545 110 | 6/2005 |
| EP | 1 545 111 | 6/2005 |
| JP | 2001 313721 | 11/2001 |
| JP | 2002 073783 | 3/2002 |
| JP | 2002 142024 | 5/2002 |
| JP | 2002 152387 | 5/2002 |
| JP | 2002 163400 | 6/2002 |
| JP | 2002 237897 | 8/2002 |
| JP | 2002 244842 | 8/2002 |
| JP | 2003 069720 | 3/2003 |
| JP | 2003 110702 | 4/2003 |
| JP | 2003 234833 | 8/2003 |
| JP | 2004 023262 | 1/2004 |
| JP | 2004 260430 | 9/2004 |
| JP | 2005 286979 | 10/2005 |
| RU | 2 143 135 C1 | 12/1999 |
| WO | WO 2004/030330 | 4/2004 |

OTHER PUBLICATIONS (Author not indicated), "The Phone Call That Speaks Your Language", Money magazine, Jun. 1991, p. 32, vol. 20 No. 6.
(Author not indicated), "News and Reports—AT&T Language Line", Managing Service Quality, 1995, vol. 5 No. 1.
(Author not indicated), "NHS Direct Translator—National Health Services", Chemist & Druggist magazine, Sep. 25, 2004.
Blayne Cutler, "Multilingual Marketers Work For The Police", American Demographics, Jan. 1992, p. 10, vol. 14 No. 1.

(Author not indicated), "Telephone Translators Covered In Deal Between SSH And California Company", Hospital Materials Management, Jun. 2002.

Frederick Gabriel, "Providers Say 'Ah', 'Ay' and 'Oy'—Health Care Providers Which Treat Non-English Patients Must Contend With Cultural And Linguistic Challenges", Crain's New York Business, Jan. 26, 1998, 14(4):30.

Brendan B. Read, "Gracias Por Llamar (Thank You For Calling)", Call Center Magazine, Oct. 2003, p. 32, vol. 16 No. 10.

Phil Zinkewicz, "In Any Other Language—Translators Handle Emergency Calls Or Business/Industry Needs", Insurance Advocate, Mar. 8, 2004, p. 2.

Language Line Services, "Commonly Asked Interpretation Questions And Answers", Jun. 22, 2004.

Carey Gillam, "Language Line Gives Guests A Chance To Reach Out Touch A Translator", The Kansas City Business Journal, Aug. 30, 1991, p. 2, vol. 9 No. 50.

(author not indicated), "The Phone Call That Speaks Your Language", Money magazine, Jun. 1991, p. 32, vol. 20 No. 6.

(author not indicated), "News and Reports - AT&T Language Line", Managing Service Quality, 1995, vol. 5 No. 1.

(author not indicated), "NHS Direct Translator - National Health Services", Chemist & Druggist magazine, Sep. 25, 2004.

Blayne Cutler, "Multilingual Marketers Work For The Police", American Demographics, Jan. 1992, p. 10, vol. 14 No. 1.

(author not indicated), "Telephone Translators Covered in Deal Between SSH and California Company", Hospital Materials Management, Jun. 2002.

Frederick Gabriel, "Providers Say 'Ah', 'Ay' and 'Oy'- Health Care Providers Which Treat Non-English Patients Must Contend With Cultural and Linguistic Challenges", Crain's New York Business, Jan. 26, 1998, 14(4):30.

Brendan B. Read, "Gracias Por Llamar (Thank You for Calling)", Call Center Magazine, Oct. 2003, p. 32, vol. 16 No. 10.

Phil Zinkewicz, "In Any Other Language - Translators Handle Emergency Calls Or Business/Industry Needs", Insurance Advocate, Mar. 8, 2004, p. 2.

Language Lines Services, "Language Line Services Tutorial" 1995.

Language Line Services, "Commonly Asked Interpretation Questions And Answers", Jun. 22, 2004.

Language Line Services, "Over-The-Phone Language Interpretation . . . How Does That Work Exactly?", http://www.languageline.com/prod_serv_interp.php, 2 pages. 2006.

Tele-Interpreters, "Tele-Interpreters On-Call", http://web.archive.org/web/19990128224906/http://www.teleinterpreters.com/, 8 pages. 2006.

Tele-Interpreters, "Over-The-Phone Language Interpretation Services", http://www.teleinterpreters.com/otp_interpretation_services.aspx, 3 pages. 2006.

Network Omni, "On-Demand and Global OPI Services. 24/7/365 in 150 Languages", http://www.networkomni.com/opi-offering.asp, 2 pages. 2006.

Network Omni, "Translating on Demand in 140 Languages", http://web.archive.org/web/20000308070011/www.networkomni.com/TranslationLine.html, 2 pages. 2006.

* cited by examiner

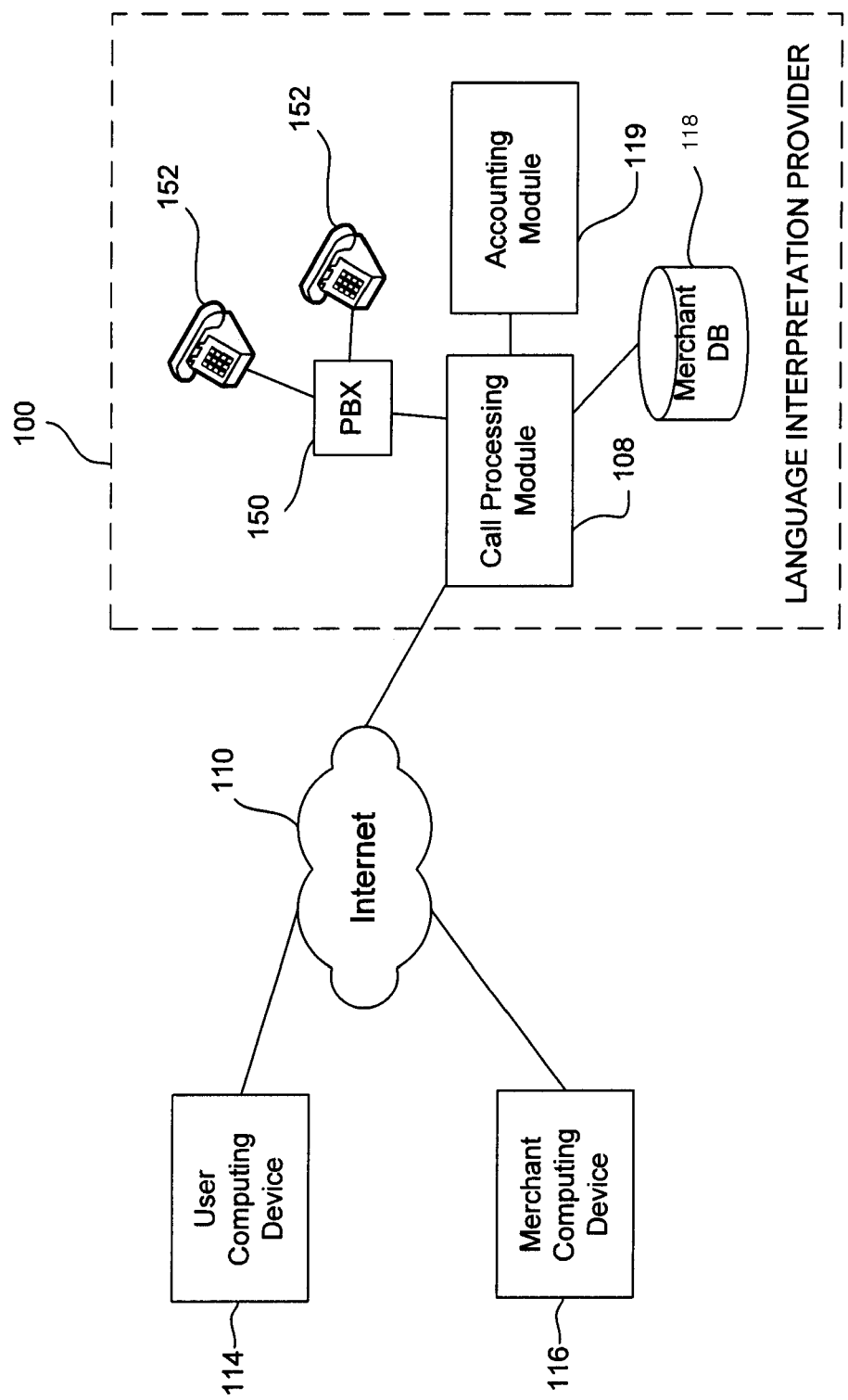

SYSTEMS AND METHODS FOR PROVIDING LANGUAGE INTERPRETATION

RELATED APPLICATIONS

This application is a Continuation-In-Part of U.S. patent application Ser. No. 11/277,318, filed on Mar. 23, 2006, entitled SYSTEM AND METHOD FOR PROVIDING A LANGUAGE INTERPRETATION LINE which in turn is a continuation in part of U.S. patent application Ser. No. 11/226,526, filed on Sep. 13, 2005, entitled LANGUAGE INTERPRETATION CALL TRANSFERRING IN A TELECOMMUNICATIONS NETWORK.

BACKGROUND

1. Field of the Disclosure

The present disclosure relates generally to offering language interpretation services. In particular, the present disclosure relates to providing a language interpretation line.

2. General Background

Modern telecommunications systems permit international multilingual communication which in turn is based on effectively communicating in a common language. Many businesses increasingly depend on global commerce, specifically on goods and services flowing freely and clearly. An integral part of business transactions is oral communication that is understood immediately. Often, however, the customer and the business do not speak the same language. In order to provide better service and improve commercial transactions with customers, many businesses subscribe to interpretation services to perform such necessary interpretation between the customer and the business.

When a customer calls a business speaking a different language, a language interpreter is procured, and the transaction is conducted. However, the customer experience can be frustrating and confusing at times. For each business transaction that the customer requires, the customer has to call each business and wait for an interpreter to join the telephone call. In addition, there are businesses that do not provide language interpretation services, sometimes transgressing legal mandates that require equal language interpretation for all consumers.

SUMMARY

In one aspect, there is a method of providing a language interpretation service. A language interpretation number that services multiple languages can be provided. The language interpretation number can be used to place a telephone call to a language interpretation service for language assistance. A language interpretation telephone call is received at the language interpretation service provider from a caller speaking a first language. The caller can place the language interpretation telephone call by dialing the language interpretation number. A business need of the caller is identified. A business entity that is a subscriber to the language interpretation service and that can satisfy the business need of the caller is identified. An interpreter that can interpret between the first language and a second language spoken by an agent of the business entity can be identified. The interpreter and the agent of the business entity are engaged to the language interpretation telephone call. The interpreter can then interpret a conversation between the caller and the agent of the business entity.

In another aspect, there is system for providing language interpretation comprising an incoming call telephonic module and an outgoing call telephonic module. The incoming call telephonic module receives an incoming telephone call from a caller speaking a first language. A language interpretation number can be used to place the incoming telephone call to a language interpretation service for language assistance. The incoming call telephonic module can be associated with a language interpretation provider. The caller can be greeted in the first language by an interpreter associated with the language interpretation service provider. The outgoing call telephonic module permits the interpreter to telephonically engage an agent representing a business entity. The business entity can be a subscriber to the language interpretation provider. The agent speaks a second language and the interpreter interprets a conversation between the caller and the agent.

In yet another aspect, there is a method of providing a language interpretation service. The method comprises providing a three-digit language interpretation number that services multiple languages. The three-digit language interpretation number can be used to place a telephone call to a language interpretation service for language assistance. A language interpretation telephone call can be received at the language interpretation service provider from a caller speaking a first language. The caller places the language interpretation telephone call by dialing the three-digit language interpretation number. A business need of the caller is identified. A business entity that is a subscriber to the language interpretation service and that can satisfy the business need of the caller is identified. An interpreter that can interpret between the first language and a second language spoken by an agent of the business entity can be identified. The interpreter and the agent of the business entity can be telephonically engaged in the language interpretation telephone call. The interpreter interprets a conversation between the caller and the agent of the business entity.

DRAWINGS

FIG. 1B illustrates a component diagram of a system for providing language interpretation services through a language interpretation number utilizing a communications network.

Figure 2A:
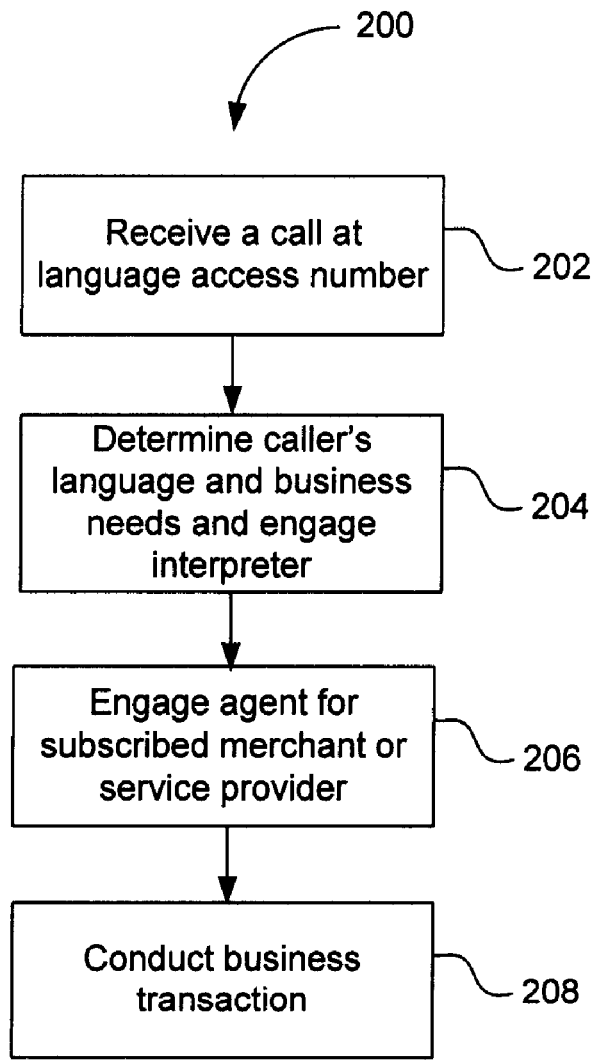
Figure 2B:
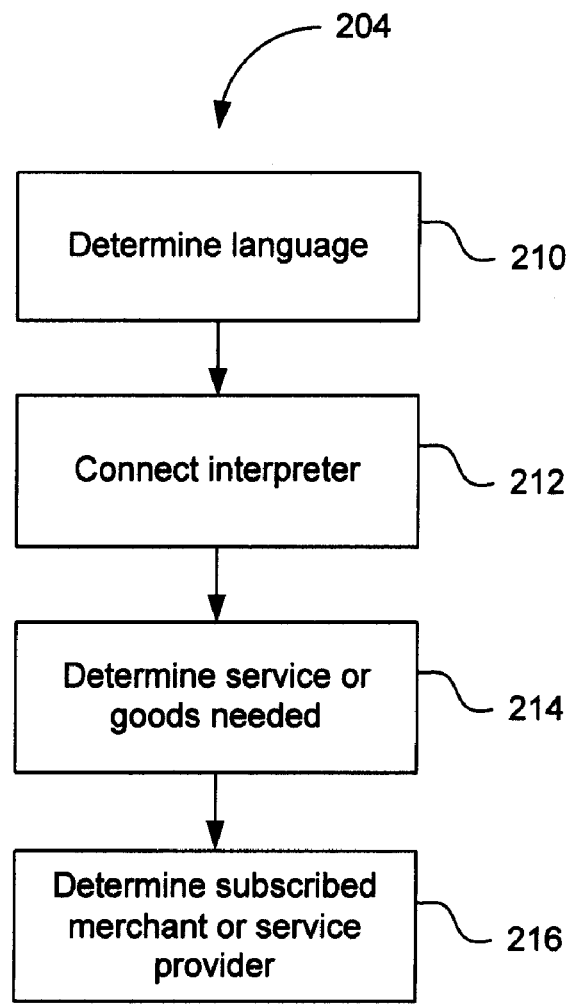
Figure 2C:
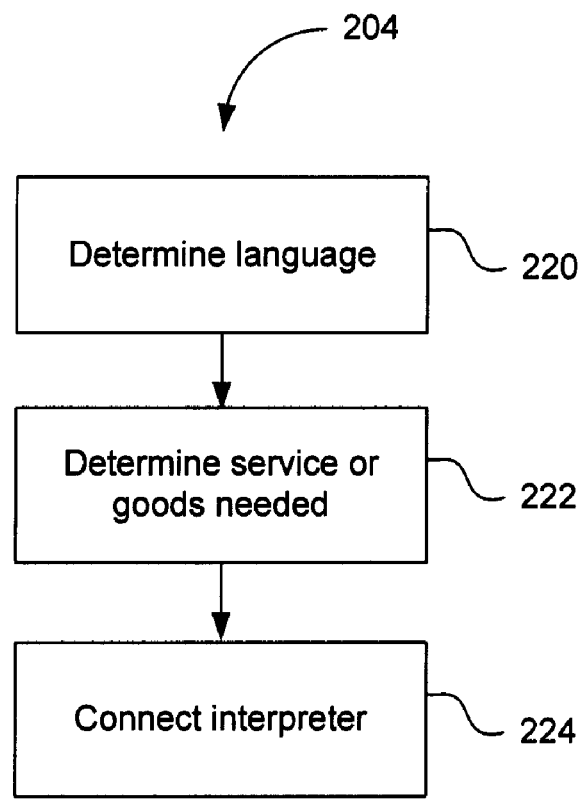

FIG. 2A-C illustrate flow diagrams for processes to service a customer call to the language interpretation number.

Figure 3:
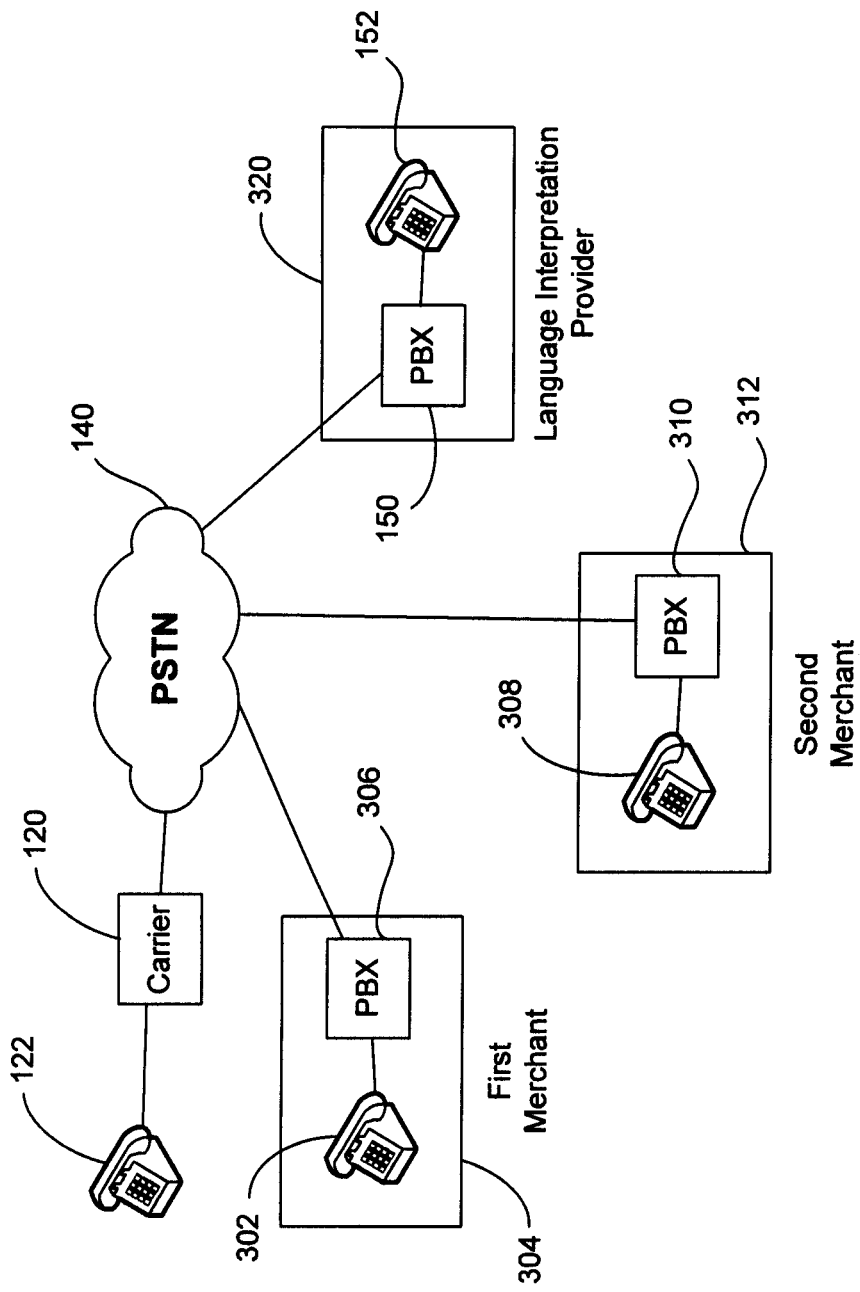

FIG. 3 illustrates an alternative component diagram of a language interpretation service.

Figure 4:
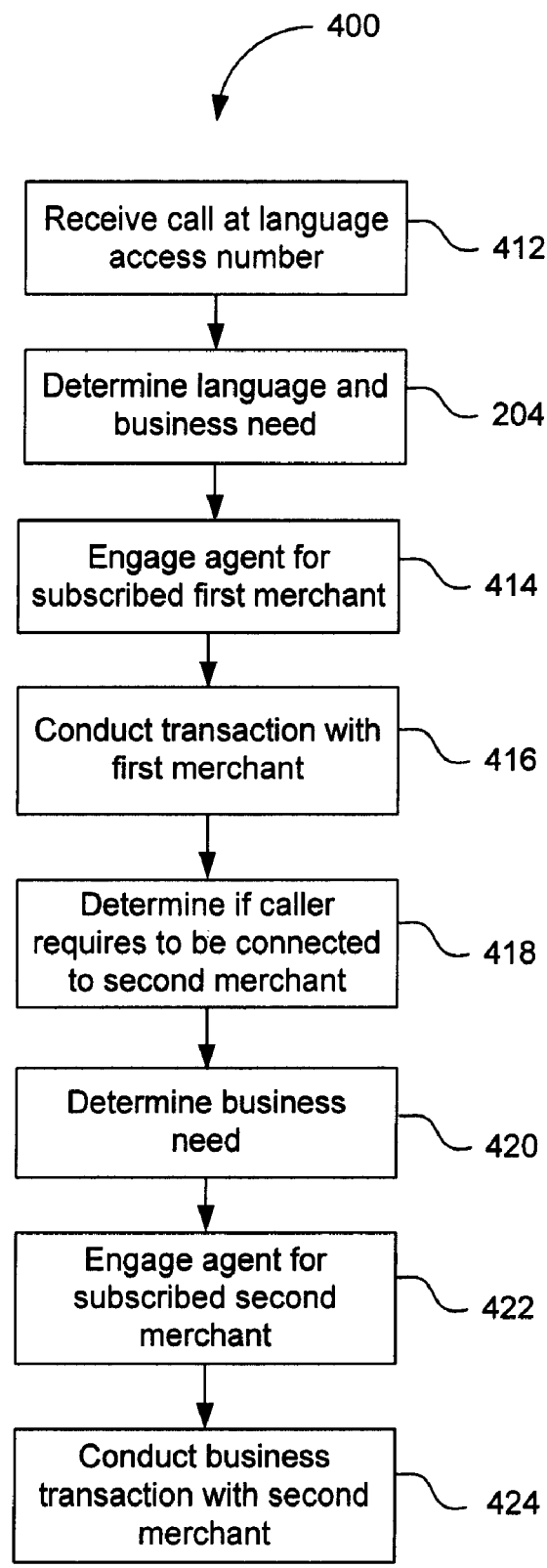

FIG. 4 illustrates an alternative flow diagram for a process to service a customer call to the language interpretation number.

Figure 5A:
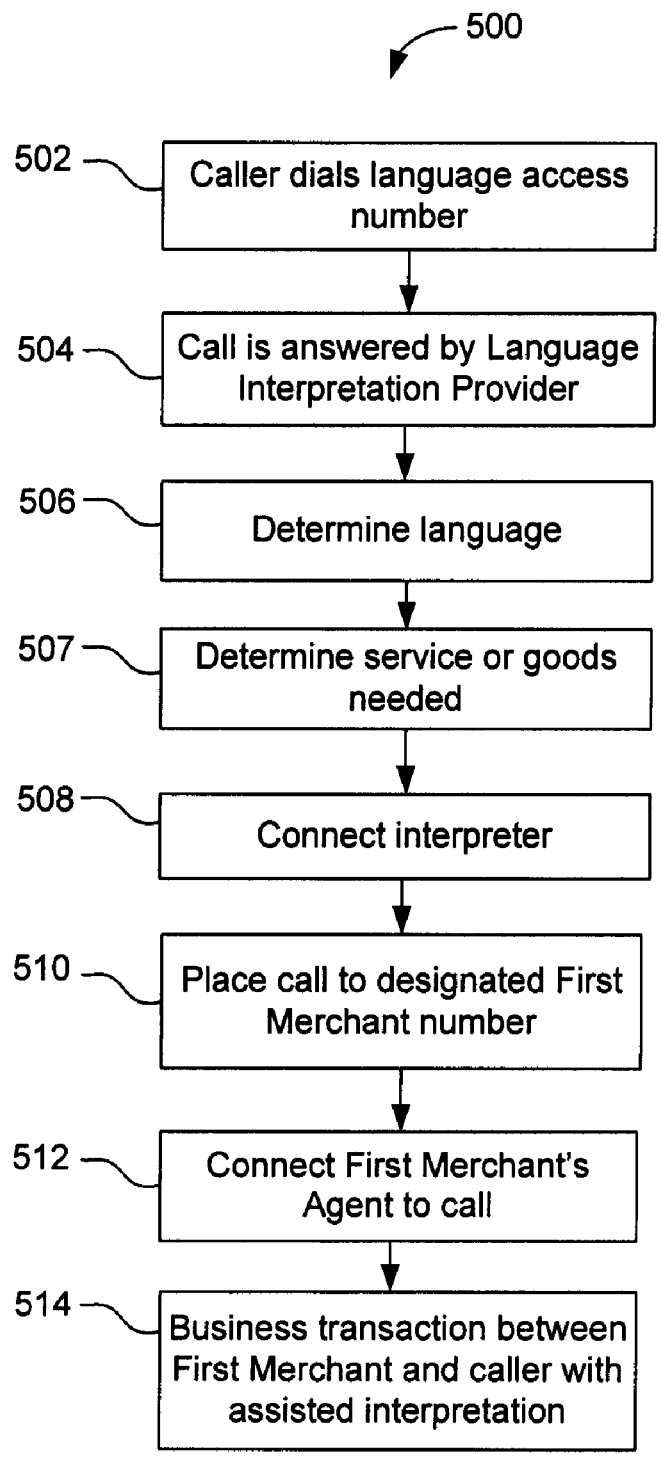

FIG. 5A illustrates a call flow diagram for a process wherein a customer calls a language number.

Figure 5B:
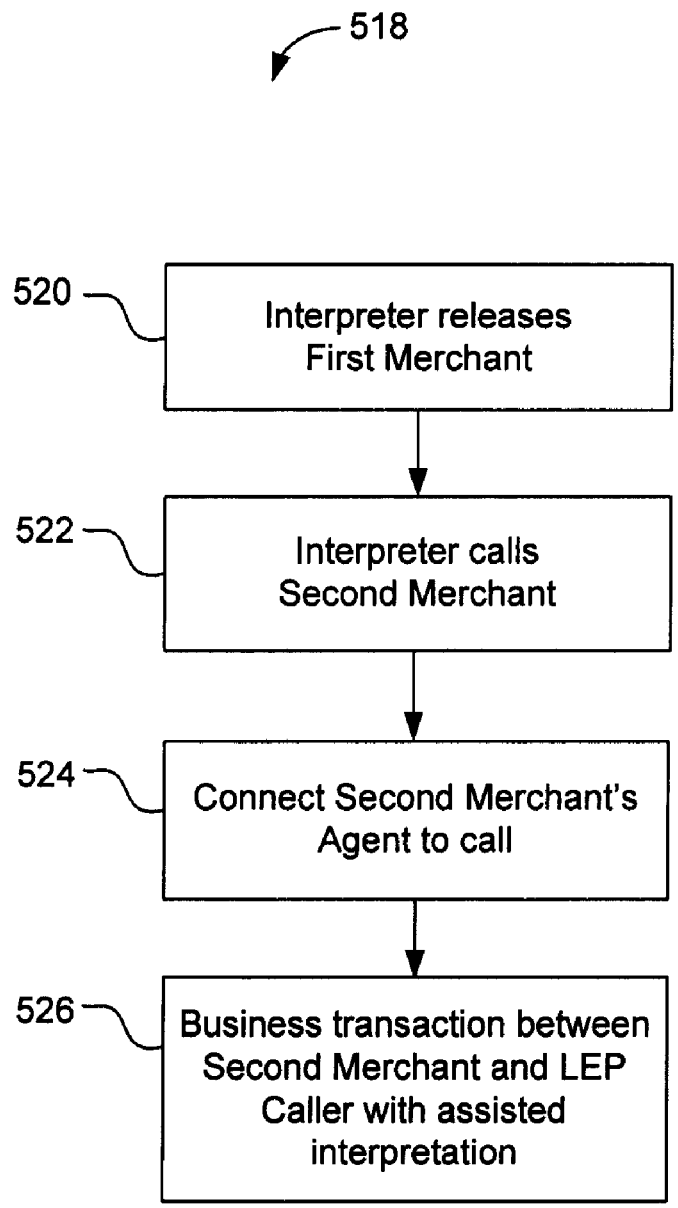

FIG. 5B illustrates a call flow diagram for a process wherein a customer is referred to a second merchant.

Figure 6:
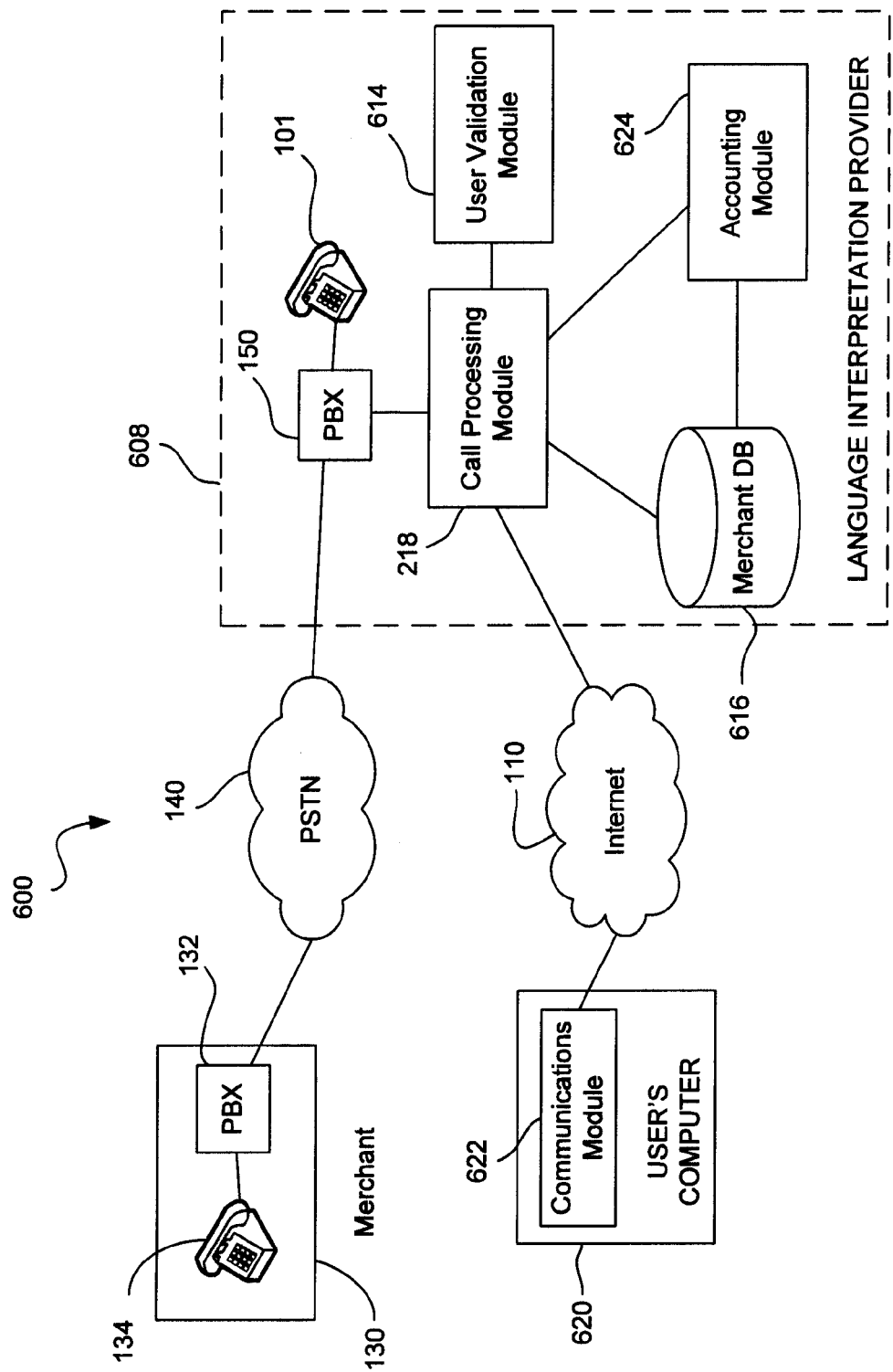

FIG. 6 illustrates a system for providing language interpretation services through the Internet and a public switched network.

DETAILED DESCRIPTION

A method and system to provide a language interpretation line is disclosed. A language interpretation line number can be provided to customers of any language. The language interpretation line number can be a toll or a toll-free number. In another example, the language interpretation number is a three-digit number, such as for example, 811. Any other language interpretation number can be utilized. Customers can dial the language interpretation line number and be assisted by an interpreter speaking the customer's language. In addition, the customer can be assisted in identifying a specific need of the customer and the entity that can provide a solution to the need of the customer. For example, an automated system can be provided to interact with the customer and identify a business need of the customer, as well as the merchant that can satisfy such need. In another example, the interpreter can assist the customer to identify business needs, servicing, or any other needs. Furthermore, the automated system can permit a customer to identify a business entity, or merchant that can fulfill the business need of the customer. The business entity is a subscriber to the language interpretation provider. In one example, the business entity pays a subscription fee to be a subscriber of the language interpretation provider. The language interpretation provider can then give priority to the subscriber business entity when suggesting business to the customer.

In addition to interpretation services, the interpreter can facilitate communication with third parties. For example, the interpreter can also act as an operator that connects the caller to multiple businesses, etc. The interpreter can assist the customer in the native language of the customer. The interpreter can connect, in a three-way call, the customer, the business entity or merchant, and the interpreter. In another example, an automated system can be utilized to connect in a three-way call between the interpreter, the customer and the merchant.

As such, the customer can be connected with representatives of banks, hospitals, government agencies, companies, merchants, service providers, or any other public or private entity. The customer can then conduct any transaction with the public or private entity with the assistance of the interpreter.

In one aspect, the customer can be connected with merchants and businesses that are part of a business network. The business network can be a group of business or commercial entities that provide over-the-phone customer service. Members of the business network can be entities that are recruited by the language interpretation provider. In another aspect, business entities pay a subscription fee to become part of the business network. In other aspect, business entities become part of the business network through various methods.

In addition, the methods and systems provided herein permit the customer to conduct transactions with a second company or private or public entity. The transaction with the second company can be conducted in the same call once the first transaction has ended. Moreover, the same interpreter that assists the customer in the first call can assist the customer in the second call.

In addition, the second company engaged to transact business with the customer can be a company that offers products or services that are complementary to those of the first company. Modern companies engage in agreements with other companies that offer complementary products and services. As part of these agreements, customer telephone calls are transferred from one customer center to that of the complementary company. When the customer is a limited English proficiency (LEP) caller, and an interpreter is on the line with the first company, the second company would benefit from receiving the call with the customer and the interpreter on the line. In another embodiment, calls can to be billed to the company using the phone line and the interpreter time. Thus, once a call is transferred, the first company stops incurring interpretation costs, while the second company that engaged the customer starts incurring interpretation costs.

The system and method disclosed herein permits non-English speaking customers to be handled in the same way as English speaking callers, thus providing partner companies the opportunity to expand their customer base and to significantly increase revenue. Furthermore, revenue potential is also increased because non-English speaking customers are much more likely to remain on the line and conduct business with other businesses offering in-language services when the interpreter remains on the call.

A caller using this method will further benefit by having a source of affiliated companies offering language interpretation services. In one example, an non-English-speaking caller that is connected to an airline company can be given the option of having the call transferred to a car rental company call center once the caller has completed all airline related concerns. If the customer accepts the transfer, the process benefits all of the parties involved. The airline benefits from a referral fee paid by the car rental company. The car rental company benefits from the contact with a receptive customer in need of car rental services. Finally, the customer benefits from reducing the complexity of the travel-planning process.

Figure 1A:
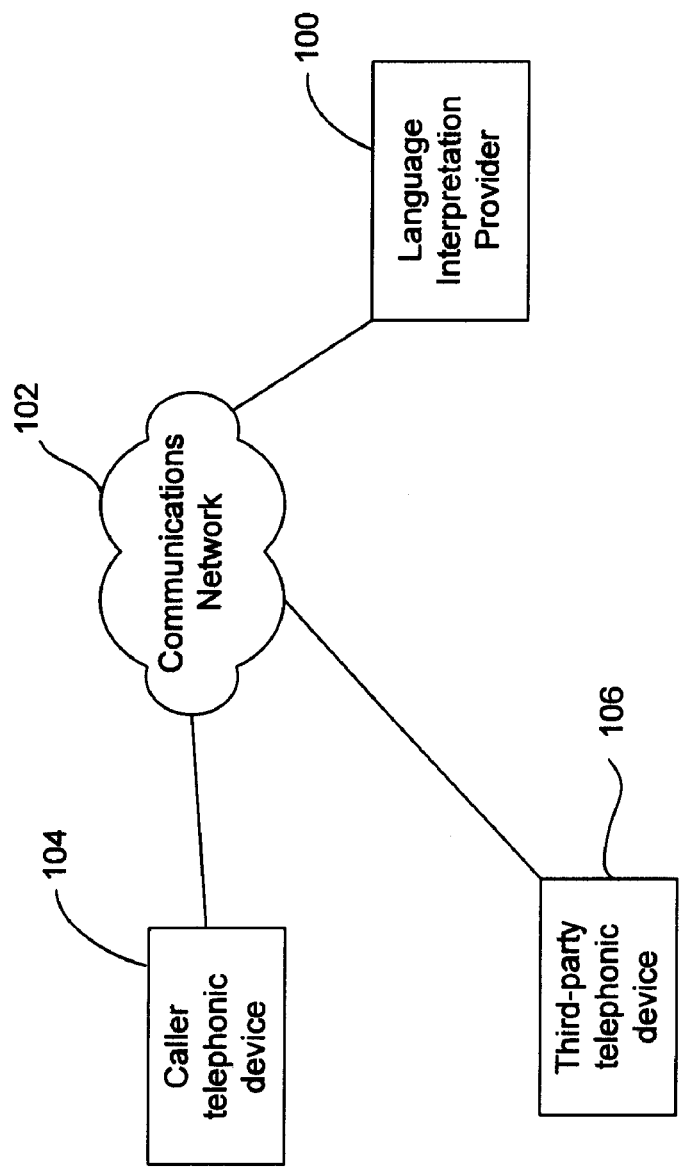
FIG. 1A illustrates a component diagram of a system for providing language interpretation services through a language interpretation number.

FIG. 1A illustrates a component diagram of a system for providing language interpretation services through a language interpretation number. A caller can utilize a caller telephonic device 104 in order to place a call to the language interpretation number. The telephonic device 104 can be a landline telephone, a cellular telephone, a computing device equipped with a modem, etc.

The language interpretation number can be a single number that can service multiple languages. Therefore, callers speaking different languages can dial the language interpretation number in order to receive interpretation services. The language interpretation number can be used to place a telephone call to the language interpretation provider for language assistance. The language interpretation provider 100 receives the call through a communications network 102. Examples of a communications network 102 include a public switched network, the Internet, an intranet, etc.

In one embodiment, the language interpretation provider 100 is configured to identify the business need of the caller, or any other need. In addition, the language interpretation provider 100 can have third-party subscriber businesses and entities that provide one or more services. For example, the subscriber businesses can be banks, pharmacies, hospitals, etc. The language interpretation provider 100 can also identify a business merchant that can satisfy the business need of the customer. For example, the language interpretation provider can include an automated system to interact with the caller and determine the business need, or at least the business type for which the caller is calling about.

In a further embodiment, the language interpretation provider 100 is configured to identify the language of the caller so as to provide the caller with an interpreter that can interpret between the language of the caller and a language spoken by the third-party subscriber.

Thus, the third party and the caller can be engaged in a three-way call with the interpreter. The interpreter can interpret a conversation between the caller and the third party. The third party subscriber can utilize a third-party telephonic device 106 to communicate to the language interpretation service 100 and the caller.

In another embodiment, non-subscriber third parties can also be engaged to fulfill the caller's business need. In one example, the non-subscriber third party can pay a fee for being connected to the call. In another example, the caller can pay a fee for connecting to a non-subscriber third party. Accounting logic, for example as part of a computerized accounting module, can be included in the language interpretation provider infrastructure in order to calculate different accounting and billing mechanisms for each language interpretation call.

FIG. 1B illustrates a component diagram of a system for providing language interpretation services through a language interpretation number utilizing a communications network. The user computing device 114 is an example of the caller telephonic device 104 that a caller can utilize in order to make a telephone call to the language interpretation provider 112. In addition, the merchant computing device 116 is an example of the third party telephonic device 106 that a third party, (e.g., merchant) can utilize in order to engage in a telephone call with language interpretation provider 112 and the caller.

In one embodiment, the language interpretation provider includes a call processing module 108 that is configured in a computer system. The call processing module 108 can be configured to receive, forward, and connect telephone calls.

The call processing module 108 can be configured with an interactive voice response system. The interactive voice response system can automatically respond to the incoming phone calls from caller and can provide language interpretation options as well as other options that can allow the caller to customize the circumstances of the call, and specific needs. The data collected by the interactive voice response system can be relayed to provide a description to an interpreter of what kind of service the caller is requesting. The interactive voice response system can be further configured to recognize multiple languages and dialects so as to better assist the caller. In addition, the interactive voice response system can be equipped with logic to categorize the type of language (e.g., Asian, Arabic, Latin, and Germanic).

In another embodiment, the call processing module 108 can be configured to collect data pertaining to the incoming and outgoing calls. This data can be, for example, caller information, automatic number identification (ANI), time and date when the phone call was started, time and date when the phone call ended, the total number of minutes, associated third parties connected to the phone call, etc.

In one example, the call processing module 108 can be connected to a merchant database 118 and an accounting module 119. The merchant database 118 can include records of subscriber merchants. Therefore, a caller that calls the language interpretation line can be connected to one of the subscriber merchants in the merchant database 118 according the needs of the caller. Furthermore, the accounting module 119 tracks the calls that have been routed to the merchant database 118, the interpretation time, etc. As discussed below, the accounting module 119 can be configured with logic to calculate the billings required for a telephone call received from the caller.

Figure 1C:
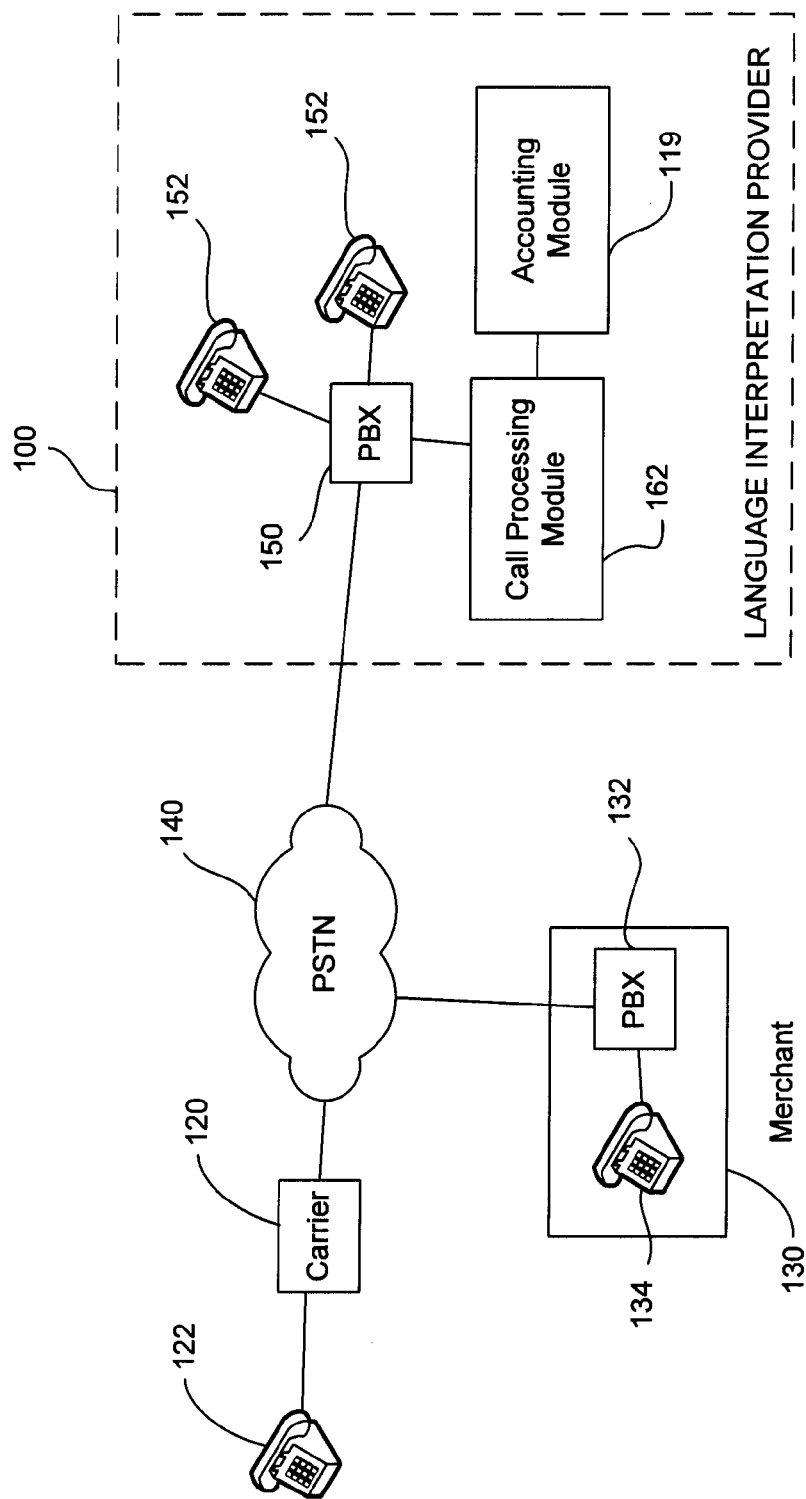
FIG. 1C illustrates a component diagram of a system for providing language interpretation services through a language interpretation number utilizing a public switched network.

FIG. 1C illustrates a component diagram of a system of a language interpretation service in a public switched network. The communications network allows customer requiring language interpretation to communicate telephonically with any private or public entity. For example, a limited-English-proficiency (LEP) caller 122 can make a phone call through a public switch network 110 to a language interpretation number (e.g., 811) in order to conduct a business transaction.

In one embodiment, the primary private branch exchange 150 utilizes an interactive voice response system. As previously stated, the interactive voice response system can automatically respond to the incoming phone calls from LEP caller 122 and can provide language interpretation options, recognize multiple languages and dialects, categorize the type of language, identify the business need of the caller. In another embodiment, the interactive voice response system can be integrated in the call processing module 162.

The telephone call to the language interpretation line can be received by a language interpretation provider 160. The language interpretation provider 160 assists the LEP caller 122 to transact business by providing assistance of an interpreter 152. When a LEP caller 122 calls the language interpretation number, the call from the LEP caller 122 can be routed through a carrier 120 connected to the public switch network 110. In another embodiment, the carrier 120 can be configured to directly route the call to a language interpretation provider 160. The call can then be routed to the language interpretation provider 160, and thereafter be routed to a primary private branch exchange 150. After the call is routed to a private branch exchange 150, an interpreter 152 can receive the phone call from the LEP caller 122. The private branch exchange 150 may or may not be part of the language interpretation provider 160.

In another embodiment, the call can be received at an incoming call telephonic module (not shown), wherein an incoming telephone call from the LEP caller 122 is received. The incoming call telephonic module is part of the language interpretation provider infrastructure. For example, the incoming call telephonic module can be part of the private branch exchange 150. In another example, the incoming call telephonic module can be part of the call processing module.

In one embodiment, the interactive voice response system can be utilized to determine the business need of the caller. The interactive voice response system assists the LEP caller 122 to establish whether the LEP caller's 122 business needs involves an emergency. In one embodiment, the interactive voice response system assists the LEP caller 122 to transact business with a merchant 130. Once the merchant has been identified, the interactive voice response system can provide the identified merchant information to the interpreter so that the interpreter connects the call to the merchant. As such, the interpreter 152 can then assist the LEP caller 122 to transact business with a service provider 140. The interpreter 152 can then connect the phone call, through the public switch telephone network 110, to a customer service representative 138 of the service provider 130 through a corresponding private branch exchange 130.

In another embodiment, the interpreter 152 assists the LEP caller 122 to determine what type of business need, or service the LEP caller 122 needs. In one embodiment, the interpreter 152 assists the LEP caller 122 to establish whether the LEP caller's 122 business needs involves an emergency. In one embodiment, the interpreter 152 assists the LEP caller 122 to transact business with a merchant 130. The interpreter 152 can then connect the phone call, through the public switch telephone network 110, to a customer service representative 134 of the merchant 130 through a corresponding private branch exchange 132. In another embodiment, the LEP caller 122 does not have a business need but instead simply requests a service. In one embodiment, the interpreter 152 can make a phone call through an outgoing call telephonic module (not shown). The outgoing telephonic module permits the interpreter 152 to telephonically connect or engage an agent representing the merchant 130.

FIG. 2A illustrates a flow diagram for a process 200 to service a customer call to the language interpretation number. At process block 202, an inbound call is received. The call is the result of the LEP caller 122 dialing the language interpretation number. As previously stated, the language interpretation number can be a toll-free number or a customer-paid service. In addition, the number can be any combination of numbers. If the number is in the United States, for example, the number can start with the prefix 800. In another example, the number can be 811. The process 200 then continues to process block 204.

At process block 204, the language required by the LEP caller 122 is determined. Furthermore, at process block 204 the business need, service required, or any other request by the LEP caller 122 can also be determined. The process 200 continues to process block 206.

At process block 206, the appropriate agent for the subscriber merchant or service provider is engaged. As previously stated, the merchant or service can be engaged by an automated system, such as an interactive voice response system, or by the interpreter. For example, once the LEP caller 122 expresses a specific need or requirement, and the correct type of service is identified, an analysis can be made to determine a business organization or entity that can provide the goods or services required by the LEP caller 122. For example, the LEP caller 122 may request banking services without a specific bank name. Thus, the language service provider offers a list of options to the LEP caller 122 who chooses from a list of subscriber banks. In addition, a list of non-preferred non-subscriber banks can also be provided to the caller if no subscriber banks are identified or none of the banks can provide banking services as requested by the LEP caller 122. In another instance, if no subscriber banks are identified, the language service provider can choose a bank at random to provide service to the LEP caller 122.

In another example, the LEP caller 122 can provide a name of a specific business entity to which the LEP caller 122 wants to be connected. The process then continues to process block 208 wherein the business transaction required by the LEP caller 122 is conducted with the business entity.

FIG. 2B illustrates an exemplary flow diagram for the process 204 to handle an incoming call that was dialed using a language interpretation number. At process 204, the language and business needs of the LEP caller 122 are determined.

At process block 210, the language spoken by the LEP caller 122 is identified. Various algorithms and methods can be utilized to correctly and quickly identify the language spoken by the LEP caller 122. In one embodiment, linguists or other language experts can be utilized first to determine the root of the language. In another embodiment, interactive voice response can be used to determine the language. In another embodiment, voice recognition systems can be used to determine the language. The process 204 then continues to process block 212.

At process block 212, an interpreter 152 is connected based on the language identified at process block 210. The interpreter 152 can then help the LEP caller 122 to determine the problem or need of the LEP caller 122. In addition, the interpreter 152 can connect the LEP caller 122 with an agent of a business entity that provides that solution, product or service. The process 204 then continues to process block 214.

At process block 214, the goods or services needed by the customer are determined. Thus, business need, service required, or any other request by the LEP caller 122 can also be determined. In one example, the LEP caller 122 is inquired about the reason for the call, or the services needed by the LEP caller 122. The LEP caller 122 can identify exactly his or her needs such as banking, travel agencies, airlines, car rental companies, health care services, entertainment services, emergency, geographical information, weather information, etc. Once the business needs of the LEP caller 122 are identified, the process 204 then continues to process block 216.

At process block 216, the merchant, business entity, or service provider are determined. In another embodiment, the interpreter 152 can determine the merchant or service provider that can best assist to resolve the LEP caller's 122 needs. In one example, the interactive voice response system, or engages an agent of the business entity that the interpreter 152 believes to be the most appropriate to address the LEP callers 122 needs. In another example, the interpreter 152 can give the LEP caller 122 the option of selecting the business entity among a list of entities capable of addressing the LEP caller's 122 needs. In another embodiment, the LEP caller 122 requests for a specific merchant or service provider that can best assist to resolve the LEP caller's 122 needs.

FIG. 2C illustrates an exemplary flow diagram for the process 204 to handle an incoming call that was dialed using a language interpretation number. At process block 220, the language spoken by the LEP caller 122 is identified. The process 204 then continues to process block 222. At process block 222, the goods or services needed by the customer are determined. In one embodiment, the interactive voice response system can interact with the caller to determine the business need of the caller as well as the merchant or service provider that can best assist to resolve the LEP caller's 122 needs. In one example, the interactive voice response system can give the LEP caller 122 the option of selecting the business entity among a list of entities capable of addressing the LEP caller's 122 needs. In another example, the LEP caller 122 requests for a specific merchant or service provider that can best assist to resolve the LEP caller's 122 needs. The process 204 then continues to process block 224. At process block 224, an interpreter 152 is connected based on the language identified at process block 220.

FIG. 3 illustrates an alternative component diagram of a language interpretation service. As previously stated, the interpreter 152 assists the LEP caller 122 to determine what type of business need, or service the LEP caller 122 requires. In one embodiment, the interpreter 152 assists the LEP caller 122 to transact business with a first merchant 304 and with a second merchant 312.

The interpreter 152 can connect the phone call, through the public switch telephone network 140, to a customer service representative 302 of the first merchant 304 through a corresponding private branch exchange 306.

Once the transaction with the first merchant 304 has finished, the LEP caller 122 can be connected to a second merchant 312 through the public switch network 140. As such, after the LEP caller 122 finishes the transaction with the first merchant 304, the interpreter 152 can stay on the line with the LEP caller 122 and interpret a business transaction between the LEP caller 122 and the second merchant 312. Thus, the interpreter 152 can further assist the LEP caller 122 to determine any further business need that the LEP caller 122 may have.

In one example, the phone call can be connected to the second merchant 312 through a private branch exchange 310 to the customer service representative 308 which can be an employee of the second merchant 312.

In one embodiment, the merchant 304 and the second merchant 312 are business partners such that when a phone call is received by the merchant 312, the merchant 312 can be able to offer services that are complemented or supplemented by the services or the products provided by the second merchant 304.

FIG. 4 illustrates an alternative flow diagram for a process 400 to service a customer call to the language interpretation number. At process block 412, a call from the LEP caller 122 is received. The LEP caller 122 calls the language interpretation number in order to be provided with language assistance to conduct one or more transactions. The language interpretation number can be, for example, an 811 number. The process 400 continues to process block 204.

At process block 204, the language required to communicate with the LEP caller 122 is determined. Furthermore, at process block 204 the business need, service required, or any other request by the LEP caller 122 can also be determined. The process 400 continues to process block 414.

At process block 414, an agent for the first merchant is engaged. In one embodiment, the first merchant is selected or suggested by an interactive voice response system. In another embodiment, the first merchant can be selected by the interpreter. In another embodiment, the first merchant can be selected by the LEP caller 122. The process 400 continues to process block 416.

At process block 416, the transaction between the LEP caller 122 and the first merchant is conducted. The transaction can be assisted by the interpreter 152 who can interpret from the language of the LEP caller 122 to the language of the agent for the first merchant, and vice versa. The process 400 continues to process block 418.

At process block 418, a determination is made as to whether the LEP caller 122 requires to be connected to another merchant. The interpreter can inquire to the LEP caller 122 whether the LEP caller 122 has further business needs. The LEP caller 122 may require service from another service provider, or may wish to purchase goods from another merchant, etc. If the LEP caller 122 requires further transactions, the process 400 continues to process block 420.

At process block 420, the business entity or service provider is determined. Therefore, once the business need of the LEP caller 122 is identified, an appropriate business entity can be identified so as to provide the services or goods required by the LEP caller 122. The process 400 continues to process block 422.

At process block 422, an agent of the second business entity identified as capable to provide services or goods to the LEP caller 122 can be engaged. The agent of the second business entity can be engaged by an automated system or by the interpreter. The interpreter can then start to provide interpretation services between the second merchant or service provider and the LEP caller 122. Therefore, at process block 424 a business transaction is conducted with the second merchant.

Billing

Various billing configurations can exist. In one embodiment, a first billing corresponds to the period starting at the time of the connection between the LEP caller 122 with the language interpretation provider, and ending when an interpreter is engaged. A second billing can correspond to a period starting at the time the interpreter is engaged, until the business merchant or service is engaged. Furthermore, there can be a third billing that starts when a business, merchant or service provider is engaged with the LEP caller 122 while an interpreter 152 interprets the business transaction. There can also be a fourth billing that starts when a subsequent business, merchant or service provider is engaged with the LEP caller 122 while an interpreter 152 interprets a subsequent business transaction. In another embodiment, one single billing can be provided in which only one party is responsible for payment.

FIG. 5A illustrates a call flow diagram for a process wherein a customer calls a language number. In process block 502, the LEP caller 122 dials a language assistance telephone number (e.g. 811). The LEP caller 122 dials the language assistance number in order to receive customer service assistance in the language that is requested by the LEP caller 122.

In process block 504, the call is received by the language interpretation provider 100. As such, the inbound call received in process block 504 can be received at primary private branch exchange 150. In addition, in process block 504 a first billing begins. In one embodiment, the first billing is charged to the governmental body. U.S. Federal regulations provide that equal access to basic services must be provided to all individuals, which includes language interpretation. For example, under U.S. Federal regulations, any entity, including states and local governments, receiving federal funding must provide equal access to their services. Therefore, some government bodies can commit to pay for the costs of language interpretation calls.

In another embodiment, the first billing is charged to the merchant or service provider with whom the call will be connected and with whom the LEP caller 122 conducts business. The merchant has the incentive that further business can be created if the LEP caller 122 is provided with interpretation services. In another embodiment, the first billing cost is charged to the LEP caller 122. In yet another embodiment, the first billing cost is absorbed by the language interpretation provider 100.

Next, in process block 506 the language required by the caller is determined. The interactive voice response system connected to the primary private branch exchange 150 can lead the LEP caller 122 through a series of questions that requires the input of at least one keystroke on the telephone handset. In one embodiment, the interactive voice response system can request the customer to say the language that the customer requires or would utilize to conduct a business transaction with the merchant. After the information is gathered from the LEP caller 122, the interactive voice response system 156 can connect the caller to the interpreter 152.

In process block 507, the services or goods required by the caller is determined. The interactive voice response system can also prompt the LEP caller 122 for a broad category of the type of service that the LEP caller 122 requires. For example, the caller may call to inquire about pharmacy services, and to be connected to a pharmacy. The interactive voice response system can receive the data from the LEP caller 122 and relay it to the interpreter 152 so that the interpreter 100 is best prepared for assisting the LEP caller 122. For example, the interpreter can start locating pharmacies in the area while the LEP caller 122 is being transferred. In another embodiment, the interpreter 152 has a telephone connection to receive data and control information so that the interpreter 152 can best provide service to the LEP caller 122. In a further embodiment, the caller can convey, through the interactive response system, the specific business entity to be used. In another embodiment, the interpreter assists the caller to determine the type of business required as and/or the specific business entity that can serve the caller's needs.

In process block 508, the interpreter is connected. Therefore, the first billing stops and the second billing begins. In one embodiment, the second billing is charged to a governmental body. In another embodiment, the second billing is charged to the merchant. Besides providing merchant an incentive to pay for the call by increasing business for merchant, when the call is transferred to merchant and charged to merchant, a governmental body may be further induced to pay for the second billing which is only the first few minutes of the call. After the interpreter 152 has been connected, the services of interpretation start running for the benefit of merchant, and therefore the merchant can be charged for the third billing. In another embodiment, the LEP caller 122 can pay for the third billing. In yet another embodiment, the third billing cost is absorbed by the language interpretation provider 100.

In one example, the interpretation time can be charged to the merchant as soon as the interpreter 152 is connected. As such, in process block 508, the call is then rerouted to an interpreter 152 who answers the call in the language identified. In one embodiment, the interpreter 152 can be provided with a specific signal (e.g. audio or visual) indicating specific information that the LEP caller 122 is requesting. The signal can be sent from the interactive voice response system. As such, the interpreter 152 can serve multiple merchants. With the appropriate signal received, the interpreter 152 can then greet the inbound call appropriately. For example, if the LEP caller 122 calls the language interpretation number wanting to be connected to a car rental company, the language interpretation provider 100 through the interactive voice response system can determine that the LEP caller 122 is calling regarding rental car services. When the interpreter 152 receives the call data regarding the LEP caller 122 needing rental car services can also be provided to the interpreter. Therefore, the interpreter 152 can better assist the language interpretation provider 100.

In process block 510, the interpreter 152 upon being connected greets the LEP caller 122. Because the interpreter 152 knows that the LEP caller 122 is a caller requiring the specific language that the interpreter 152 is qualified to provide, the interpreter 152 can immediately assume that the call can be conducted in the language the interpreter 152 is qualified to interpret. If the data received by the interpreter 152 indicates that the customer or that the LEP caller 122 requested specific a service, then the interpreter 152 does not need to request the LEP caller 122 to provide any further information. For example, the LEP caller 122 can tell the interpreter 152 that the LEP caller 122 is calling to inquire about signing up for new service. However, if in process block 507 the interactive voice response system prompted the LEP caller 122 with the question of whether new service is required or not, and the LEP caller 122 affirmed that new service is required, then such information can be relayed directly to the interpreter 152. The information is related through previously provided equipment to the interpreter 152 so that the interpreter 152 is then on notice that the LEP caller 122 requires new service. If the agent of the merchant is English speaking only, the interpreter 152 can interpret the business transaction between the English-speaking agent and the LEP caller 122.

In process block 512, the first merchant's agent is added to the call thus effectively initiating a three-way call between the interpreter 152, the LEP caller 122, and the first merchant's agent. In one example, the connection is made automatically by the call processing module 162 or 108. This, can be made based on data that the caller initially provided to the interactive response system. Once the interpreter is connected, the call can be immediately and automatically placed to the business requested by the caller. In another example, the connection with the first merchant is made by the interpreter. Thus, once the interpreter is connected the interpreter can dial the number of the merchant, or otherwise interact with a telephonic device or computing device in order to connect with an agent of the merchant of business.

Upon the first merchant 304 being connected, the second billing can stop and a third billing can start. Again, the third billing can be billed to different entities according to the billing arrangements designed by the language interpretation service, the caller, and/or the merchant. In one embodiment, the merchant pays for the third billing. In another embodiment, a governmental agency pays for the third billing. In yet another embodiment, the caller pays for the third billing.

In process block 514, the business transaction between the first merchant's 304 agent and the LEP caller 122 is conducted. This business transaction is possible because of the interpretation services that the interpreter 152 provides. In other words, the interpreter can interpret the LEP caller's 122 statements into the language spoken by the agent of the first merchant 304, and can further interpret the statements made by the first merchant's 304 agent into the language spoke by the LEP caller 122.

In one embodiment, the language spoken by the merchant 304 can be English, Spanish, or any other language that is official to the merchant 304. The language being interpreted is, of course, the language required by the LEP caller 122 to conduct business with the merchant 304.

In one embodiment, the LEP caller 122 can be a caller proficient in Spanish requesting interpretation from Spanish to English. The LEP caller 122 may dial the language interpretation number (e.g., 811) to make inquiries and to receive services from one or more business entities. Each of the business entities or merchants may speak only English. For example, the merchant can be an electronics store that provides services in English. The LEP caller 122 speaks only Spanish and requests access to the electronics store services to the language interpretation provider 100. Interpretation provider 100 can then connect the call to the interpreter 152 so that the interpreter 152 can speak Spanish with the LEP caller 122 and English with the electronics store.

In another embodiment, the LEP caller 122 can be a caller proficient in English requesting interpretation from another language to English, where the business speaks a language other than English. For example, the business can be a Korean airline and provides services in Korean. An English-speaking caller requesting access to Korean services can call the language interpretation provider 100. Interpretation provider 100 can then connect the call to the interpreter 152 so that the interpreter 152 can interpret Korean with the merchant 304 and English with the LEP caller 122. In this case, of course, the caller does not necessarily have a limited English proficiency, but rather, the caller is not proficient in Korean language.

FIG. 5B illustrates a call flow diagram for a process wherein a customer is referred to a second merchant. After the business transaction with the first merchant 304 has been conducted, the LEP caller 122 queried as to whether a subsequent referral to a partner or a second merchant 312 is required. In one embodiment the second merchant 312 is a partner of the merchant 304 that provides supplementary or complementary businesses, services and products to the merchant 304. One of supplementary services can be a rental car agency to an airline reservation system or a hotel reservation system. Another example of supplementary services is a doctor's office and a pharmacy. If the caller does not require any more assistance or referral to other merchants or services providers, the call is finished, the third billing stops.

On the other hand, if the LEP caller 122 requires further services or business assistance, then the caller is assisted to fulfill further needs. At process block 520, the interpreter 152 releases the first merchant 304 from the three-way call taking place between the interpreter 152, the first merchant 304, and the LEP caller 122. As soon as the interpreter 152 releases the merchant 304 from the call, the third billing stops. Furthermore, a fourth billing can begin. In one embodiment, the fourth billing is charged to the governmental body. In another embodiment, the fourth billing is charged to the merchant or service provider with whom the call will be ultimately connect and with whom the LEP caller 122 will conduct business. In another embodiment, the fourth billing cost is charged to the LEP caller 122. In yet another embodiment, the fourth billing cost is absorbed by the language interpretation provider 100.

In process block to 522, the interpreter 152 calls the second merchant 312. Next, in process block 524 the agent of the second merchant is connected to the call. The fourth billing stops and a fifth billing starts. Again, the fifth billing, as indicated earlier in relation to other billings, can be assigned to a governmental or charitable organization, to the merchant, to the caller or to the language interpretation provider. Next in process block 524 the business transaction between the second merchant 312 and the LEP caller 122 is conducted.

The interpreter can continue to help the LEP caller 122 with subsequent calls and business needs. The LEP caller 122 may decide to request a new merchant depending on the business need of the LEP caller 122. For instance, the LEP caller 122 may decide that he needs services supplementary to the services just provided by the second merchant 312. Examples of supplementary services can be hotel reservation systems and airline reservation systems. A third supplementary service to be provided could be, for example, a car rental service. Many other combinations of business partnerships exist where each business partner provides supplementary products or services to the other business partner. If the LEP caller 122 decides to request a third merchant, at process block 528 the interpreter 152 releases the connection with the second merchant 312 from the phone call and the fifth billing stops. At that point, the interpretation services for the second merchant 312 have finished. In one embodiment, the second merchant 312 will no longer be charged for interpretation services. In addition, in another embodiment, a sixth billing can start.

FIG. 6 illustrates a system for providing language interpretation services through the Internet and a public switched network. A caller can utilize the user's computer 620 to connect to the Internet 110. In one embodiment, the user utilizes a communications module 622 that resides in the user computer 620. The communications module 622 connects to the Internet 604 and communicates with the call processing module 218 provided by the language interpretation provider 608. The communications module 622 can be a standalone application residing in the user's computer 620.

In one embodiment, at the user's computer 620, the user can interact with a communications module 622 to dial the language interpretation number (e.g., 811) and request language interpretation service. The language interpretation provider 608 can provider a call processing module 618 that can communicate through a voice-over-IP protocol with the call communications module 622. Other data communication protocols can be utilized.

Thus, for example, travelers and business professionals around the world having Internet access can request live language interpretation through the language interpretation number. Internet access locations, such as Internet cafés, Internet hotspots, and the like are pervasive in many countries and cities of the world. Users here can access the Internet and easily register for language interpretation service.

In one embodiment, the call processing module 218 can be communicated with a merchant database 616, which in one example is a relational database. The merchant database 616 is utilized to suggest to the caller subscriber merchants to fulfill the caller's business needs.

Furthermore, the call processing module 218 can further be configured with an interactive voice response system that can prompt the user to provide the user identifier. In one example, the interactive voice response system interacts with the user in the local language. In another example, the voice recognition system can recognize that type of language spoken by the caller.

In yet another embodiment, an accounting module 624 can be provided within the language interpretation provided infrastructure. The accounting module can be a standalone computer or server, or a process in a web server or another server. The accounting module 624 can be configured to with logic to calculate correct billing charges to payment accounts provided by the user. Billing can be incurred on a per-minute basis, on a per-call basis, or a monthly basis, etc.

As previously stated, billing periods of a call can be assign for payment to different entities. For example, the first billing can be absorbed by the language interpretation provider, while the rest of the billings are charged to the merchant to whom the caller was connected. Many other permutations and combinations of an interpretation call are possible. The accounting module 624 can be configured with logic to perform calculation based on interpretation rates and usage time.

In one embodiment, the merchant can be connected through a public switched network 140 through the private exchange 150. Thus, the call processing module 218 can be configured to interface calls with the private branch exchange 150 and through the Internet.

Although certain illustrative embodiments and methods have been disclosed herein, it can be apparent form the foregoing disclosure to those skilled in the art that variations and modifications of such embodiments and methods can be made without departing from the true spirit and scope of the art disclosed. For example, although all of the examples refer to a limited-English proficient customer, the language interpretation paradigm can apply to any language spoken by the customer and/or the private or public entity with which the customer wants to transact business.

Many other examples of the art disclosed exist, each differing from others in matters of detail only. Accordingly, it is intended that the art disclosed shall be limited only to the extent required by the appended claims and the rules and principles of applicable law.

What is claimed is:

1. A method of providing language interpretation comprising:

providing a language interpretation number that services multiple languages, wherein the language interpretation number can be used to place a telephone call for language interpretation;

receiving a language interpretation telephone call at a language interpretation provider from a caller speaking a first language, wherein the caller places the language interpretation telephone call by dialing the language interpretation number;

identifying a business need of the caller;

determining a group of business entities that can each satisfy the business need of the caller;

selecting, from the group of business entities, a first business entity that is a subscriber for a subscription fee to the language interpretation provider for language interpretation for the first business entity over a second business entity that is not a subscriber for a subscription fee to the language interpretation provider for language interpretation for the second business entity;

identifying an interpreter that can interpret between the first language and a second language spoken by an agent of the first business entity; and telephonically engaging the interpreter and the agent of the first business entity in the language interpretation telephone call, wherein the interpreter interprets a conversation between the caller and the agent of the first business entity.

2. The method of claim 1, wherein identifying the business need of the caller is performed by an interactive voice response system.

3. The method of claim 1, wherein identifying the business need of the caller is performed by the interpreter.

4. The method of claim 1, wherein identifying the business entity that can address the business need of the caller is performed by an interactive voice response system.

5. The method of claim 1, wherein identifying the business entity that can address the business need of the caller is performed by the interpreter.

6. The method of claim 1, further comprising establishing a billing that accounts a time count accruing from a time at which the language interpretation telephone call starts until a time at which the interpreter is engaged.

7. The method of claim 6, wherein the billing is paid by a government entity, a business entity, the interpretation service provider, or the caller.

8. The method of claim 1, further comprising establishing a billing that accounts a time count accruing from a time at which the interpreter is engaged until a time at which the agent representing a merchant is engaged.

9. The method of claim 8, wherein the billing is paid by a government entity, a business entity, the interpretation service provider, or the caller.

10. The method of claim 1, further comprising establishing a billing that accounts a time count accruing from a time at which the agent representing the business entity is engaged until at time at which the agent representing the business entity is disengaged.

11. The method of claim 10, wherein the billing is paid by a government entity, a business entity, the interpretation service provider, or the caller.

12. The method of claim 1, wherein the business entity is a bank, a health care provider, a government entity, an airline, a rental car agency, a hotel, a travel agency, an amusement park, a resort, a casino, a cruise line, a public transportation agency, a financial company, an insurance company, or a telecommunications company.

13. The method of claim 1, wherein the language interpretation call is received through the Internet.

14. The method of claim 1, wherein the language interpretation call is received through a public switched network.

15. A system for providing language interpretation, comprising:
an incoming call telephonic module that receives an incoming telephone call from a caller speaking a first language, wherein a language interpretation number can be used to place the incoming telephone call to a language interpretation for language interpretation, the incoming call telephonic module being associated with a language interpretation provider, the caller being greeted in the first language by an interpreter associated with the language interpretation provider; and
an outgoing call telephonic module that permits the interpreter to telephonically engage an agent representing a first business entity, wherein the first business entity is selected over a second business entity from a group of business entities, wherein the first business entity is a subscriber for a subscription fee to the language interpretation provider for language interpretation for the first business entity, wherein second business entity is not a subscriber for a subscription fee to the language interpretation provider for language interpretation for the second business entity, wherein the agent speaks a second language and the interpreter interprets a conversation between the caller and the agent.

16. The system of claim 15, wherein the language interpretation number is a toll-free number.

17. The system of claim 15, further comprising an interactive voice response system that identifies a business need of the caller.

18. The system of claim 15, wherein a business need of the caller is identified by the interpreter.

19. The system of claim 15, further comprising an interactive voice response system that identifies the business entity that can address a business need of the caller.

20. The system of claim 15, wherein identifying the business entity that can address a business need of the caller is performed by the interpreter.

21. The system of claim 15, further comprising an accounting module that establishes a billing that accounts a time count accruing from a time at which the language interpretation telephone call starts until a time at which the interpreter is engaged.

22. The system of claim 21, wherein the billing is paid by a government entity, a business entity, the interpretation service provider, or the caller.

23. The system of claim 15, further comprising an accounting module that establishes a billing that accounts a time count accruing from a time at which the interpreter is engaged until a time at which the agent representing the merchant is engaged.

24. The system of claim 23, wherein the billing is paid by a government entity, a business entity, the interpretation service provider, or the caller.

25. The system of claim 15, further comprising an accounting module that establishes a billing that accounts a time count accruing from a time at which the agent representing the business entity is engaged until at time at which the agent representing the business entity is disengaged.

26. The system of claim 25, wherein the billing is paid by a government entity, a business entity, the interpretation service provider, or the caller.

27. The system of claim 15, wherein the language interpretation call is received through the Internet.

28. The system of claim 15, wherein the language interpretation call is received through a public switched network.

29. A method of providing a language interpretation, comprising:
providing a language interpretation number that services multiple languages, wherein the language interpretation number can be used to place a telephone call for language interpretation;
receiving a language interpretation telephone call at a language interpretation provider from a caller speaking a first language, wherein the caller places the language interpretation telephone call by dialing the language interpretation number;
identifying a business need of the caller;
determining a group of business entities that can each satisfy the business need of the caller;
selecting, from the group of business entities, a first business entity that is a subscriber for a subscription fee to the language interpretation provider for language interpretation for the first business entity over a second business entity that is not a subscriber for a subscription fee to the language interpretation provider for language interpretation for the second business entity;

identifying an interpreter that can interpret between the first language and a second language spoken by an agent of the first business entity; and telephonically engaging the interpreter and the agent of the first business entity in the language interpretation telephone call, wherein the interpreter interprets a conversation between the caller and the agent of the first business entity.

30. The method of claim 29, wherein identifying the business need of the caller is performed by an interactive voice response system that searches a list of members of the business network.

31. The method of claim 29, wherein identifying the business need of the caller is performed by the interpreter that searches a list of members of the business network.

32. A method of providing a language interpretation service, comprising:

providing a three-digit language interpretation number that services multiple languages, wherein the three-digit language interpretation number can be used to place a telephone call for language interpretation;

receiving a language interpretation telephone call at a language interpretation provider from a caller speaking a first language, wherein the caller places the language interpretation telephone call by dialing the three-digit language interpretation number;

identifying a business need of the caller;

determining a group of business entities that can each satisfy the business need of the caller;

selecting, from the group of business entities, a first business entity that is a subscriber for a subscription fee to the language interpretation provider for language interpretation for the first business entity over a second business entity that is not a subscriber for a subscription fee to the language interpretation provider for language interpretation for the second business entity;

identifying an interpreter that can interpret between the first language and a second language spoken by an agent of the first business entity; and telephonically engaging the interpreter and the agent of the first business entity in the language interpretation telephone call, wherein the interpreter interprets a conversation between the caller and the agent of the first business entity.

33. The method of claim 32, wherein identifying the business need of the caller is performed by an interactive voice response system.

34. The method of claim 32, wherein identifying the business need of the caller is performed by the interpreter.

35. The method of claim 32, wherein the three-digit language interpretation number is 811.

* * * * *